US012085397B1

(12) United States Patent
Garg et al.

(10) Patent No.: US 12,085,397 B1
(45) Date of Patent: Sep. 10, 2024

(54) STUDENT CUSTODY MONITORING AND TRACKING IN A FLEET ROUTING SYSTEM

(71) Applicant: Zum Services, Inc., Redwood City, CA (US)

(72) Inventors: Abhishek Garg, Redwood City, CA (US); Alexey Kononov, Redwood City, CA (US); Shiva Nagabushanaswamy, Redwood City, CA (US); Sidi Liu, Redwood City, CA (US); Andrew Mormysh, Redwood City, CA (US); Sreejith Nair, Redwood City, CA (US); Kanstantsin Gerasimovich, Redwood City, CA (US); Rashmi Choudhary, Redwood City, CA (US); Rohit Jain, Redwood City, CA (US); Melissa Shiu, Redwood City, CA (US); Niket Sanghvi, Redwood City, CA (US); Lipi Sanghi, Redwood City, CA (US)

(73) Assignee: Zum Services, Inc., Redwood City, CA (US)

( * ) Notice: Subject to any disclaimer, the term of this patent is extended or adjusted under 35 U.S.C. 154(b) by 0 days.

(21) Appl. No.: 18/527,773

(22) Filed: Dec. 4, 2023

(51) Int. Cl.
*G01C 21/34* (2006.01)
*B60W 50/14* (2020.01)

(52) U.S. Cl.
CPC ......... *G01C 21/3438* (2013.01); *B60W 50/14* (2013.01); *B60W 2050/146* (2013.01)

(58) Field of Classification Search
None
See application file for complete search history.

(56) References Cited

U.S. PATENT DOCUMENTS

| 10,685,521 | B1* | 6/2020 | Laranang | G06F 3/04842 |
| 11,378,413 | B1* | 7/2022 | Rao | G01C 21/3605 |
| 2013/0127616 | A1* | 5/2013 | Robitaille | G07C 9/20 |
| | | | | 340/539.13 |
| 2018/0227393 | A1* | 8/2018 | Daub | H04L 67/01 |

FOREIGN PATENT DOCUMENTS

| CA | 3043697 A1 * | 5/2018 | G06Q 10/08 |
| KR | 20140000453 A * | 1/2014 | |

OTHER PUBLICATIONS

Google English Translation of KR-20140000453-A (Year: 2014).*
Good Morning America, New tech lets parents track kids on school buses | GMA, Aug. 25, 2022, Youtube (Year: 2022).*

* cited by examiner

*Primary Examiner* — James J Lee
*Assistant Examiner* — Andrew Sang Kim
(74) *Attorney, Agent, or Firm* — Kilpatrick Townsend & Stockton LLP

(57) ABSTRACT

A system and method include providing a list of children to be picked up by a vehicle at a particular stop along a route to a driver device. The provided list is displayed as part of a graphical user interface which includes a plurality of pick up options for each child in the list of children. The options include a picked up interface button, a no show interface button and a canceled button. The graphical user interface provides a picture and identification of each child. The server device transmits a message to a user device with confirmation that a child has been picked up. The server device also provides a list of children to be dropped off by the vehicle via a graphical user interface that also provides drop off options for each child in the list of children including a dropped off button or an on hold button.

20 Claims, 6 Drawing Sheets

STUDENT CUSTODY MONITORING AND TRACKING IN A FLEET ROUTING SYSTEM

TECHNICAL FIELD

The present application discloses a system for routing a fleet of vehicles, scheduling stops, and optimizing those routes and stops based on one or more elements of primary concern. In particular, the present application monitors when students get on and off a bus while assigning custody of the child to another person.

BACKGROUND

The earliest advent of a fleet of vehicles likely dates back to antiquity when vehicles became necessary for the transport of people and goods. Fleets of boats are known to have existed in ancient Greece while fleets of chariots were known to have been used in ancient wars both as vehicles of war and as transport vehicles for soldiers and supplies. Even horses themselves have been used for the purpose of transporting people and goods. Indeed, many ancient stories of certain battles turn on the use of fleets of vehicles and their relative coordination in both timing and goals to the win or loss of a battle.

In the more recent past, trains, sail powered boats, and ocean liners were assembled into fleets for both military and civilian use. Since trips across continents or across oceans were typically of an extended duration, schedules and stops for these vehicles, especially in the context of civilian use, were published well in advance of an actual date of embarkation. These dates and schedules were largely accurate given the need to be at a next stop or location in a certain amount of time. Many ocean liners, for example, stopped in multiple ports to pick up passengers and goods before transporting both across the ocean. Trains kept a specific schedule on a time duration basis. For example, a train may leave from Paris for Berlin every other day allowing time for a day to make the trip from Paris to Berlin and a day to make the trip back. At the same time, other trains may have traveled from Trenton, New Jersey to New York City, New York several times per day. Historically, these schedules were based on the number of vehicles available and on the travel time necessary for trips between stops.

The advent of the modern automobile changed transportation all across the world on seemingly an overnight basis, at least in retrospect. Motorized land based transportation without the aid of rails made automobiles the transport method of choice for anything that was not too heavy or far away. Trucks could easily carry people and goods over short distances with very little notice, which was a major development for transportation. Buses became the vehicle of choice for transporting people as buses were fitted with seats for people. Trucks became the vehicle of choice for transporting goods from one place to another. As the relative prices of automobiles decreased and World Wars broke out, automobile fleets came into existence. Fleets of buses took passengers to places where rails did not exist while fleets of trucks took goods from boats in the harbor to soldiers fighting inland.

Fleet logistics became an issue of major importance to military and civilian fleet owners alike. It became imperative to ensure that certain vehicles were available for certain transportation tasks on a periodic basis, whether that basis was a multiple times per day basis, a day to day basis, a weekly basis, or some other periodic basis. Automobiles became different from fleet vehicles such as trains, boats, and other ocean going vessels because automobiles could schedule multiple trips per day while making repeated visits to a logistical hub or supply center. The pace at which trucks could supply goods outstripped anything that was previously known to human civilization and made the delivery of goods possible at scale. Buses developed scheduled times and routes for conveying passengers along certain routes at certain times.

Today, massive fleets of vehicles are owned by both governmental and private institutions to facilitate the transport of goods and passengers, which is a major logistics endeavor. Fleet vehicles may have routes which are traveled on a periodic basis to serve customers in various capacities. For example, mail is delivered to virtually every home in the United States on a daily basis by mail carriers in individual trucks. Other private mail or companies and goods delivery companies also have fleets of trucks to provide mail service for individual customers. Similarly, local governmental entities operate bus lines for mass transit of passengers, typically in and out of big cities. Public bus lines, for example, use main routes with spurs that serve residential areas of a city to facilitate passengers traveling into and out from the city on a daily basis. Both public and private schools operate bus lines to safely transport children to and from school on a daily basis. School buses, however, usually operate based on stopping at certain places at certain times to safely load children to attend local schools and, for that reason, travel routes that are based on where children live, generally speaking.

Logistics for these fleets are incredibly complex, which has been a persistent problem since antiquity. Horse cavalry attacking at the wrong time on an ancient Greek battlefield and buses arriving off schedule are different implementations of the same problem spread thousands of years apart. Maintenance, location, routing, fueling, and driver support are also considerations for fleet vehicles in order to deliver passengers or goods to a particular place by a particular time. In the context of school buses, a bus may be late because of a breakdown, construction delays, fuel problems, or a missing driver which may cause a child to be late for school. Further, school buses may serve redundant routes, which could be accommodated by a single bus, which increases the relative costs of providing bus services on virtually a daily basis. Those costs may include pollution due to emissions, fuel costs, driver costs, costs in time, and others. Current solutions are not only inefficient but wasteful and contribute to cumulative emissions based environmental harm. Optimization is needed to reduce financial, pollution, and time costs in fleet vehicle use and routing.

It is, therefore, one object of this disclosure to provide a user interface that facilitates a routing system which optimizes routes for fleet vehicles. It is another object of this disclosure to provide a monitoring system for passengers or goods on the vehicle. It is a further object of this disclosure to provide a monitoring system for monitoring custody of a child during a ride and assigning custody to another person after a ride. Also disclosed is a method for monitoring custody of passengers or goods on a vehicle.

SUMMARY OF THE DISCLOSURE

A system includes providing a list of children to be picked up by a vehicle at a particular stop along a route to a driver device. The provided list is displayed as part of a graphical user interface which includes a plurality of pick up options for each child in the list of children. The options include a picked up interface button, a no show interface button and a canceled button. The graphical user interface provides a picture and identification of each child. The server device transmits a message to a user device with confirmation that a child has been picked up. The server device also provides a list of children to be dropped off by the vehicle via a graphical user interface that also provides drop off options for each child in the list of children including a dropped off button or an on hold button. The graphical user interface provides a picture and an identification of each child. In response to receiving an indication that a child has been dropped off from the driver device, the server device transmits a message to the suer device with a confirmation of the drop off or a new estimated drop off time and location.

A method includes providing, by the server device, a list of children to be picked up by a vehicle at a particular stop along a route to a driver device. The provided list is displayed as part of a graphical user interface which includes a plurality of pick up options for each child in the list of children. The options include a picked up interface button, a no show interface button and a canceled button. The server device further provides a picture and identification of each child in the graphical user interface to the driver device with pickup options The server device transmits in response to receiving that a child in the list has been picked up from the driver device a message to the user device with confirmation that the child has been picked up. The server device, once the children in the list of children have been picked up, transmits a message to a user device with confirmation that the child has been picked up. The server device further provides, once the children have been picked up, a list of children to be dropped off by the vehicle at a particular location, the provided list being provided by the server device to the driver device as part of a graphical user interface, the graphical user interface including a plurality of drop off options for each child in the list of children, including a dropped off button and an on hold button. The server device further provides a picture and an identification for each child in the list of children in the graphical user interface to the driver device with drop off options. The server device transmits, in response to receiving an indication that a child has been dropped off from the driver device or in response to receiving an indication that the child has been placed on hold, a message to the user device confirming drop off or including a new estimated drop off time and location.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

The disclosure extends to vehicles of all types which are assembled into a fleet for a common purpose or goal such as, but not limited to, delivering passengers, delivering goods, or any other purpose.

In the following description of the disclosure, reference is made to the accompanying drawings, which form a part hereof, and in which are shown by way of illustration specific implementations in which the disclosure is may be practiced. It is understood that other implementations may be utilized, and structural changes may be made without departing from the scope of the disclosure.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
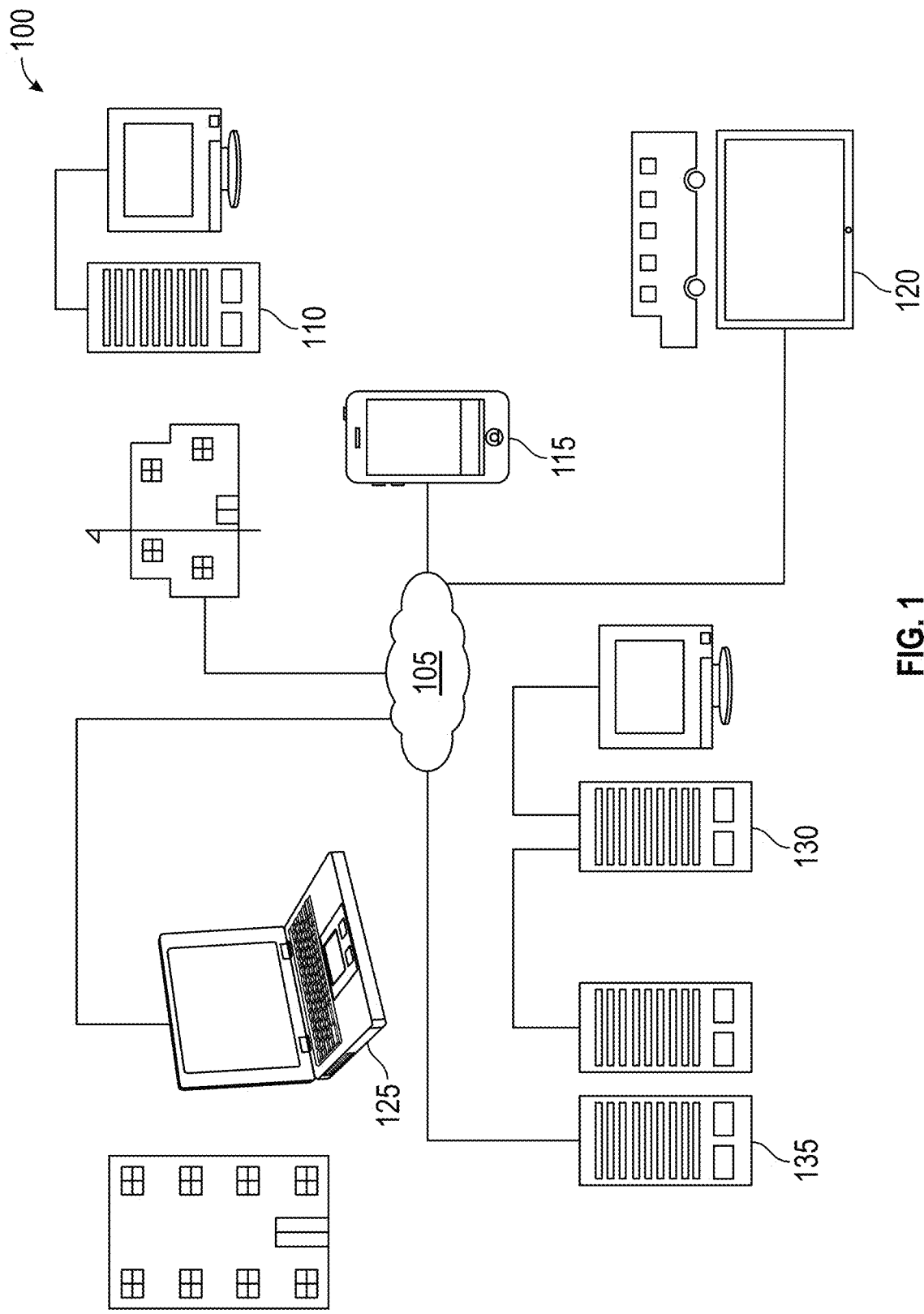
FIG. 1 illustrates box diagram of a fleet routing system.

FIG. 1 illustrates a box diagram of a fleet routing system 100. Fleet routing system may be implemented by use of a communications network 105 such as the Internet, which facilitates the exchange of information between various devices within fleet routing system 100. Fleet routing system may be used with any fleet but is described with respect to a fleet of school buses. The techniques disclosed herein may be used to deliver passengers or goods with little or no modification. Fleet routing system 100 may be implemented between a ride requestor device, such as a school device 110 (and/or an administration level device 125, which will be discussed below) and a user device 115, and a driver device 120 associated with a bus driver, for example. Fleet routing system 100 may be implemented by an administrator device 125. A provider may provide the administrator device 125 or the ride requestor device 110 with access to fleet routing system 100 by use of servers 135 and provider device 130. In one implementation, a school district may use administration level device 125 which provides buses to pick up and deliver children to a school and operate in a manner similar to ride requestor device 110. In other embodiments, ride requestor device 110 may be implemented to schedule routing for bus routes for a particular school. In other words, various levels of administration may access and implement fleet routing system 100 according to their particular needs for the delivery of passengers.

At the outset, a provider device 130 may give a ride requestor device 110 or an administrator level device 125 access to fleet routing system 100 by servers 135 to create bus routing for a particular school district or school as appropriate. Servers 135 may provide a user interface to ride requestor device 110 or an administrator level device 125 to create routes for each child in the district or school as appropriate. For example, a profile may be created for each child in the district or school as appropriate to be stored in non-volatile non-transitory storage media, which includes a home address for each child. In response, fleet routing system 100 may determine a distance between identified stops and a travel time between each of those identified stops to determine both a single bus route and a number of buses required for a necessary number of routes. For example, based on a standard bus configuration, a school bus may transport 80 seated students. However, due to time and distance constraints, a certain bus may only be able to pick up 45 students at identified stops. The identified stops may be based on ensuring a child does not cross a road or lives within a certain distance of the identified stop. If one location is heavily populated with children who need to board a school bus, optimized routing may determine that since more children are boarding per identified stop, that particular school bus may need less time to complete an assigned route. In one embodiment, fleet routing system 100 may optimize routes based on the shortest time on the road for each bus, based on minimal fuel usage across the fleet, based on minimal emissions across the fleet, based on or any other basis that is meaningful to the school or community served by the school.

Once the routes are generated with children assigned to a particular bus, server 135 may transmit bus information to user device 115 by fleet routing system 100. Bus information may include bus stop information for picking up a child and a time for pick up at the bus stop. User device 115 may be associated with the child bus rider or with a parent of the child bus rider. User device 115 may be implemented as separate devices where one device is associated with the child rider and another device is associated with a parent, guardian, or other supervisor of a child. When the school bus is operating, a real time location may be provided to user device 115 so that the child and child supervisor may identify where the bus is currently located. A child or child supervisor may use user device 115 to create the child profile discussed above by providing information from user device 115 through communications network 105 to server 135.

Further, once the routes are generated, server 135 may transmit individual route information to a bus driver via driver device 120, in fleet routing system 100. Individual route information may be a mandatory bus route for the driver to follow with a stop sequence that is identified along the individual route. Individual route information may include turn by turn instructions with expected drive time duration and distance for the bus driver. Driver device 120 may also detect information from a particular bus drive and provide that information to server 135 through communication network 135. Information provided from driver device 120 may include distance traveled information, fuel use information, pickup duration information, bus stop location information (e.g., information about where the stop is designated versus where the stop actually occurred), speed of travel information (in terms of actual speeding and in terms of slowdowns caused by traffic, construction, or any other road condition), rider verification information, rider disembarking information, and any other information that may be used by server 135 to optimize routing. In one embodiment, driver device 120 may receive an optimized route from server 135 for picking up children based on a home or a school address and/or prior pickup/drop off history locations for children on a particular route. In another embodiment, driver device 120 may further be optimized to prevent U-turns, enforce curbside pickup to avoid children crossing streets. Server 135 may receive information from driver device 120 which it may use to optimize routes based on learning from past driver routes to determine a best path between stops. Server 135 may receive information from driver device 120 which may optimize based on learned roadblocks and driver input to driver device 120 with new information (e.g., a street closure or construction) which causes server 135 to reoptimize the bus route. Server 135 may use information to determine and store driving instructions at the ride route level for a particular bus and driver device 120. Server 135 may track a bus via driver device 135 during a pickup or drop off ride and ensure compliance with the optimized route. If driver device 120 indicates that a bus is not following optimized route information, server 135 may send a message to ride requestor device 110, administrator device 125, or provider device 130 to allow either the ride requestor, the administrator, or the provider to contact the bus driver with route correction instructions.

Based on information received from driver device 120, server device 135 may maintain estimated global positioning system ("GPS") waypoints and an estimated time of arrival ("ETA") information for each ride, which may be constantly updated based on information provided by driver device 120. Driver device 120 may further provide real time routing, navigation, and path information based on a current location of driver device 120. Routing, navigation, and path information may be displayed on a screen associated with driver device 120. The user may receive, via user device 115, expected vehicle path information on a map displayed on a screen of user device 115. Thus, a user of user device 115 may be able to track bus 120 in real time and observe where a bus is currently and when a bus will be at a specific stop, which may be identified by waypoints provided to the user from server 135 via user device 115. Any data received from driver device 120 may be stored as historical data which may be used to further optimize bus routing on a permanent or temporary basis depending on road conditions, pickup/drop off requirements, and any other factor identified herein.

Ride requestor device 110, user device 115, driver device 120, administrator device 125, and provider device 130 may be implemented as any electronic device with processing power sufficient to share electronic information back and forth through communications network 105. Examples of ride requestor device 110, user device 115, driver device 120, administrator device 125, and provider device 130 include mobile phones, desktop computers, laptop computers, tablets, game consoles, personal computers, mobile devices, notebook computers, smart watches, and any other digital device that has the processing ability to interact with server 135.

Ride requestor device 110, user device 115, driver device 120, administrator device 125, and provider device 130 may include software and hardware modules that execute computer operations, communicate with communication networks 105 and server 135. Further, hardware components may include a combination of Central Processing Units ("CPUs"), buses, volatile and non-volatile memory devices, storage units, non-transitory computer-readable storage media, data processors, processing devices, control devices transmitters, receivers, antennas, transceivers, input devices, output devices, network interface devices, and other types of components that are apparent to those skilled in the art. These hardware components within ride requestor device 110, user device 115, driver device 120, administrator device 125, and provider device 130, are used to connect with server 135.

Server 135 may provide web-based access to fleet routing system 100 (or relevant portions based on which device is associated with a particular function—e.g., a parent using user device 115 may not have permissions to reroute buses) to ride requestor device 110, user device 115, driver device 120, administrator device 125, and provider device 130. Communication network 105 may be a wired, wireless, or both and facilitate communications in fleet routing system 100. Server 135 may include cloud computers, super computers, mainframe computers, application servers, catalog servers, communications servers, computing servers, database servers, file servers, game servers, home servers, proxy servers, stand-alone servers, web servers, combinations of one or more of the foregoing examples, and any other computing device that may be used to execute optimized routing and communication for web based fleet routing system 100. Server computer 135 may be implemented as one or more actual devices but are collectively referred to as server computer 135 may include software and hardware modules, sequences of instructions, routines, data structures, display interfaces, and other types of structures that execute server computer operations. Further, hardware components may include a combination of Central Processing Units ("CPUs"), buses, volatile and non-volatile memory devices, storage units, non-transitory computer-readable storage media, data processors, processing devices, processors, control devices transmitters, receivers, antennas, transceivers, input devices, output devices, network interface devices, and other types of components that are apparent to those skilled in the art. These hardware components within one or more server 135 may be used to execute the various methods or algorithms disclosed herein, and interface with ride requestor device 110, user device 115, driver device 120, administrator device 125, and provider device 130.

In one embodiment, ride requestor device 110, user device 115, driver device 120, administrator device 125, and provider device 130 may access server 135 by a communication network 105. In each case, wireless communication network 135 connects ride requestor device 110, user device 115, driver device 120, administrator device 125, and provider device 130 via an internet connection provided by communication network 105. Any suitable internet connection may be implemented for wireless communication network 105 including any wired, wireless, or cellular based connections. Examples of these various internet connections include implementations using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a 5G network and its successors, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between, ride requestor device 110, user device 115, driver device 120, administrator device 125, and provider device 130 and server 135.

Figure 2:
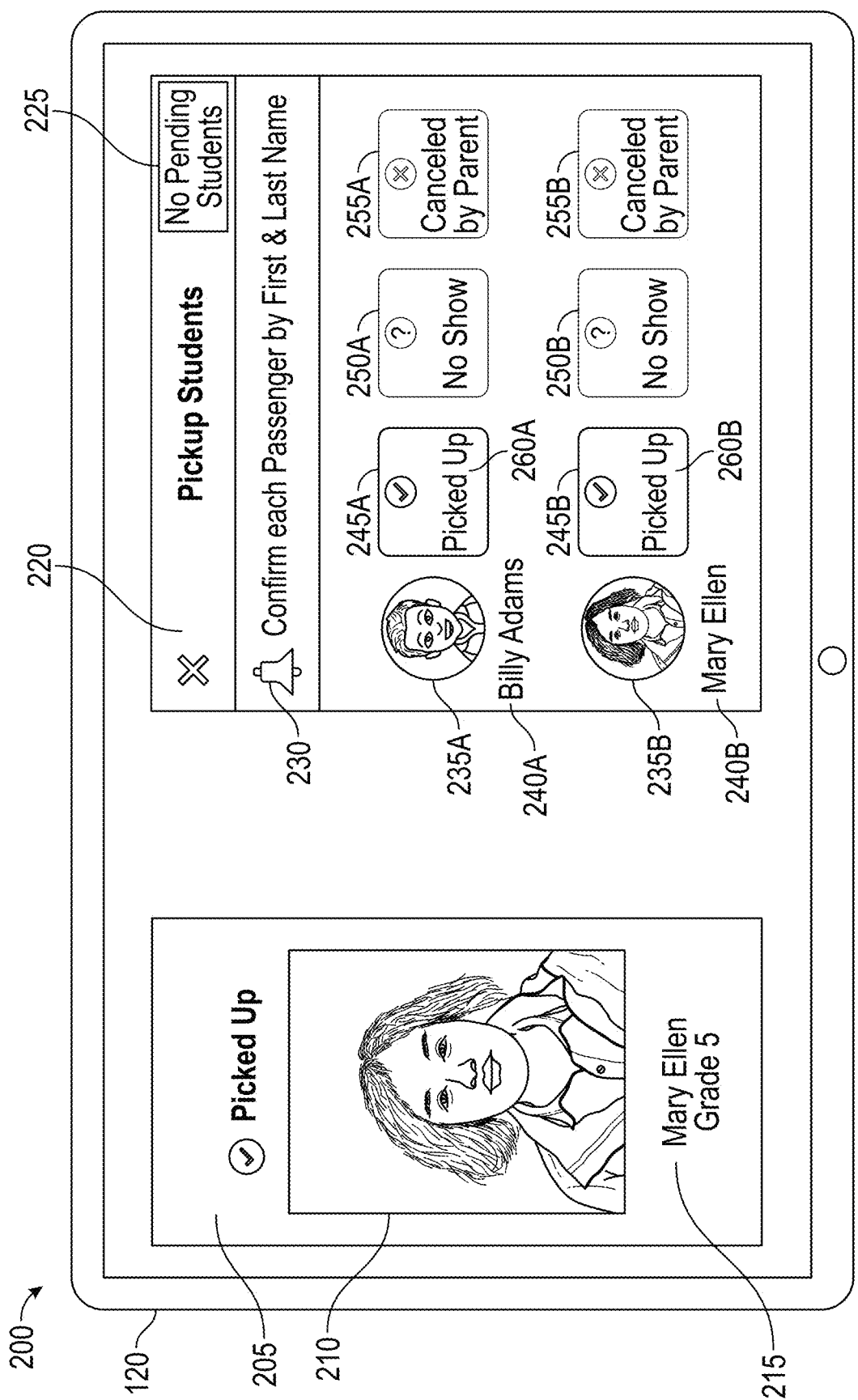
FIG. 2 illustrates an exemplary user interface for monitoring a pickup of passengers.

FIG. 2 illustrates an exemplary user interface 200 for monitoring a pickup of passengers in fleet routing system 100. User interface 200 may be provided by server device 135 to driver device 120 and may apply to picking up and delivering passengers, delivering goods, or otherwise routing fleet vehicles over a plurality of stops. For explanatory purposes, however, a driver of a school bus is explained in the context of driving a school bus, though the disclosure is not limited to this particular embodiment. User interface 200 may include an identification interface 205 which may include an indicator of a child detected by driver device 120. For example, a child boarding a bus may have an identification device that may interact with driver device 120 which provides identity information to driver device 120. In one embodiment, a child may use an RFID card or fob which uniquely identifies the child to driver device 120 when the RFID card or fob is placed in the proximity of driver device 120. Other examples of an identification device may be an electronic device that executes an application that displays a picture or emits a sound that uniquely identifies a child to the system, facial recognition on-board the bus which provides a unique identifier for each child on the bus to driver device 120, or any other identification techniques.

As shown in identification interface 205, a picture 210 of Mary Ellen, is displayed for driver identity confirmation along with an indicator 215 with information about the child's name, grade level, or any other relevant information. Identification interface 205 may also indicate that it has received confirmation from either local memory or server device 135 that the child has been "picked up" or, in other words, has boarded the bus. The driver may confirm the child's identity by using picture 210 to compare against the child who is presenting the identifier or may ask the child for the child's name to ensure that the name matches the name displayed in indicator 215. The driver may confirm the identity of the child to ensure that the information provided to server device 135 is correct information. For example, siblings may inadvertently switch RFID cards or fobs and have the sibling's card when boarding a bus. Since fleet routing system 100 already has ascertained the appropriate stop point for each child and is representing that the child has boarded the bus, ensuring that the correct child has boarded the bus helps fleet routing system 100 appropriately direct children to the correct drop off location. In the case where one sibling is intended to be dropped off at a middle school and another sibling is to be dropped off at an elementary school, identity confirmation that the correct child is boarding the bus with the correct identifier prevents incorrect drop offs. It should also be noted that if a child is not carrying an identifier, driver device 220 may accept input from the driver to identify a particular child. For example, a driver may type the child's name into identification interface 205 and confirm that the child is properly identified by the provided picture.

Driver device 120 may further be provided with a pickup interface 220 which identifies to the driver, other children who are intended to be picked up for a particular route. As shown, pickup interface 220 may include an indicator 225 of how many students or how many more students are to be picked up at a certain stop along a route. Pickup interface 220 may further include a notification element 230 which provides a bus driver with notifications about changes, updates, or other information relevant to servicing the route. For example, notification element 230 may instruct the driver to confirm each passenger by first and last name as fleet routing system 100 has detected that the bus has reached an assigned stop to pick up a certain number of children. Pickup interface 220 further includes information about riders on the bus. For example, pickup interface 220 illustrates a picture 235A of Billy Adams along with Billy's name information 240A and shows that Billy Adams has been picked up via picked up interface button 245A. An indicator 260A may further visually represent that Billy Adams has a "picked up" status which represents that Billy Adams has already boarded the bus. In the event that Billy Adams did not board the bus at the appropriate stop, pickup interface 220 further includes a no show interface button 250 where the driver can mark Billy Adams missing from the ride. Once the stop has been completed and all children at the stop have been picked up, server device 135 may receive information from driver device 120 that indicates Billy Adams was not picked up as scheduled and send a notification to user device 115, associated with Billy's mother and father, for example, and notify them that Billy was not picked up by the bus. Billy's mother and father may identify through user device 115 that they did not cancel the ride, if applicable. Otherwise, Billy's mother and father are at least notified that Billy is not on the bus and is not riding the bus to school.

Pickup interface 220 further includes a canceled interface button 255A which indicates to a bus driver, via driver device 120 and pickup interface 220 that the identified child will not be present for the bus ride so that the bus does not wait or is otherwise impacted by a child who is not intended to show up. A user of user interface 115 may provide an indication by user device 115 that a child will be absent from school for a particular day to server device 135, which may in turn, provide indicator 260A on canceled interface button 255A to indicate that a specific child is not to be picked up on that particular day. If fleet routing system 200 is aware in real-time that a child or all of the children at a particular stop will not be riding a bus, fleet routing system 200 may optimize the route by an artificial intelligence engine to re-direct the bus along a more efficient route to a next pickup location or to a drop off location, as appropriate.

Pickup interface 220 further includes information about Mary Ellen, who was identified as being picked up in identification interface 205. A picture 235B of Mary Ellen may be provided in pickup interface 220 along with Mary Ellen's name information 240B. Mary Ellen may further have buttons displayed in pickup interface 220 which include a pickup interface button 245 and associated indicator 260B visually identifying that Mary Ellen has been picked up, a no-show button interface 250B, and a canceled interface button 255B which operate as discussed above. One advantage of the foregoing techniques is that each person on the bus may be identified allowed or denied boarding as appropriate as a safety feature.

Figure 3:
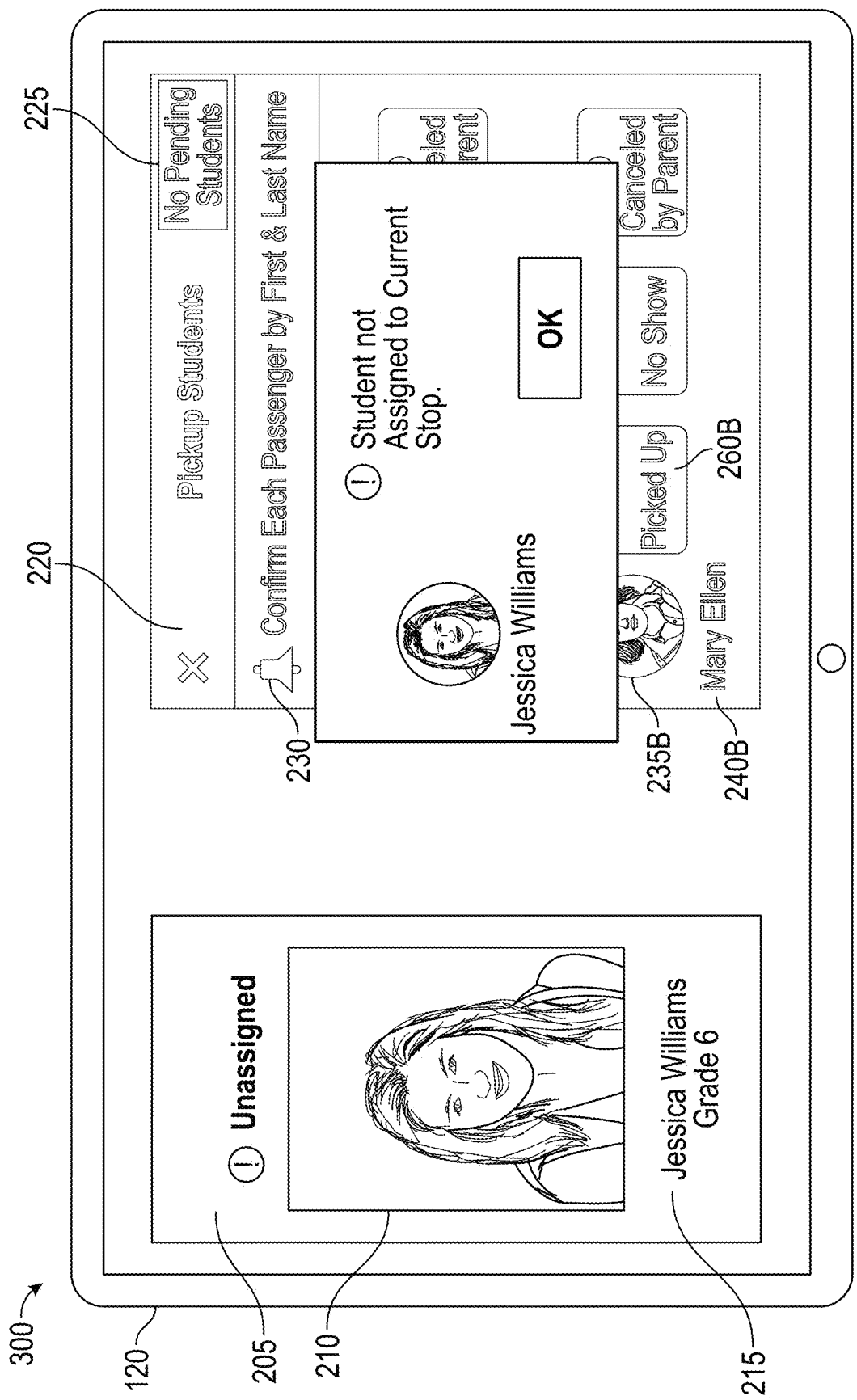
FIG. 3 illustrates an exemplary user interface for identifying an incorrect passenger.

FIG. 3 illustrates an exemplary user interface 300 for identifying an incorrect passenger. For example, once Mary Ellen has boarded the bus as discussed above with respect to FIG. 2, another child may request boarding by presenting identifier information. As shown in user interface 300, identification interface 205 on driver device 120 may indicate that an unassigned rider is attempting to board a bus. Identification interface 205 receives information from the child's identifier and server 135 receives a query to identify the person presenting an identifier. In this case, server 135 provides a picture 210 of the child and identifies the child with name information 215 as Jessica Williams, a grade 6 student. User interface 300 may further provide a notification interface that includes a picture 310 of Jessica Williams, name information for Jessica Williams, and an acknowledgement button 320 within notification interface 305. This may be referred to as a "hop on request." The notification interface may communicate information to the driver through driver device 120 that the particular student, Jessica Williams, in this example, is not a student assigned to the particular stop where Billy Adams and Mary Ellen are to be picked up. The driver may determine whether or not Jessica Williams should board the bus.

For example, if Jessica Williams missed a nearby stop for a bus servicing another route or a previous stop for the same bus, a driver may acknowledge that Jessica Williams may board the bus by interfacing with acknowledgement button 320. Server device 135 may receive an indication that Jessica Williams was allowed to board the bus and update fleet routing system 100 to provide a notification that Jessica Williams has been picked up to, for example, user device 115 associated with Jessica Williams' parents. Thus, in either the case that a child has forgotten the child's identifier or if the child is attempting to board the wrong bus, the child can be identified, allowed to board, or re-routed to the correct bus. Children at schools with significant bus service may experience difficulty in identifying the appropriate bus for boarding. Thus, fleet routing system 100 assists in helping drivers identify which bus a child should be riding and finding that bus based on information provided from fleet routing system 100. At the same time, allowing other children to board with driver authorization facilitates rides for children who may otherwise be left waiting for another ride.

Figure 4:
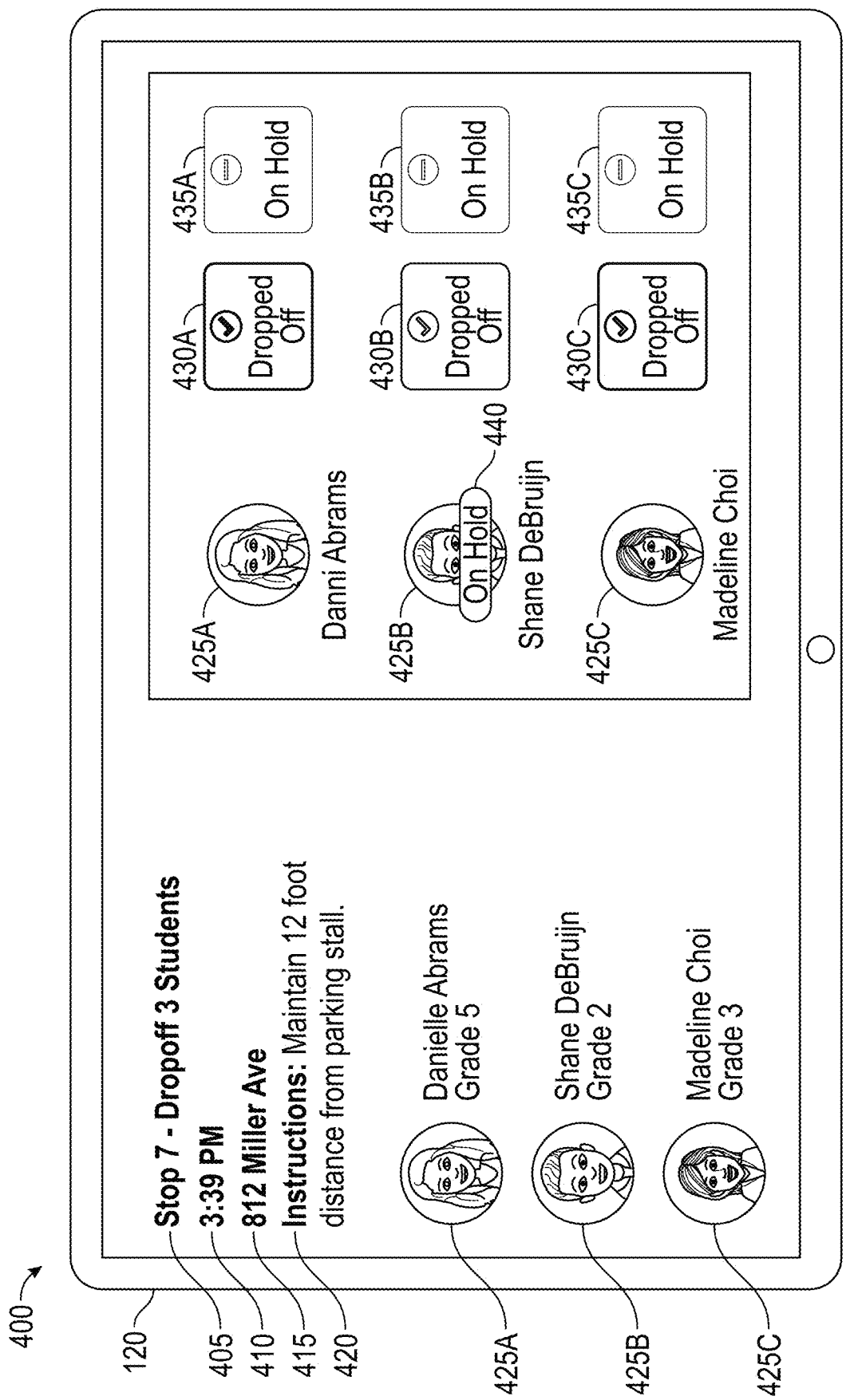
FIG. 4 illustrates an exemplary user interface for a drop off of students.
Figure 5:
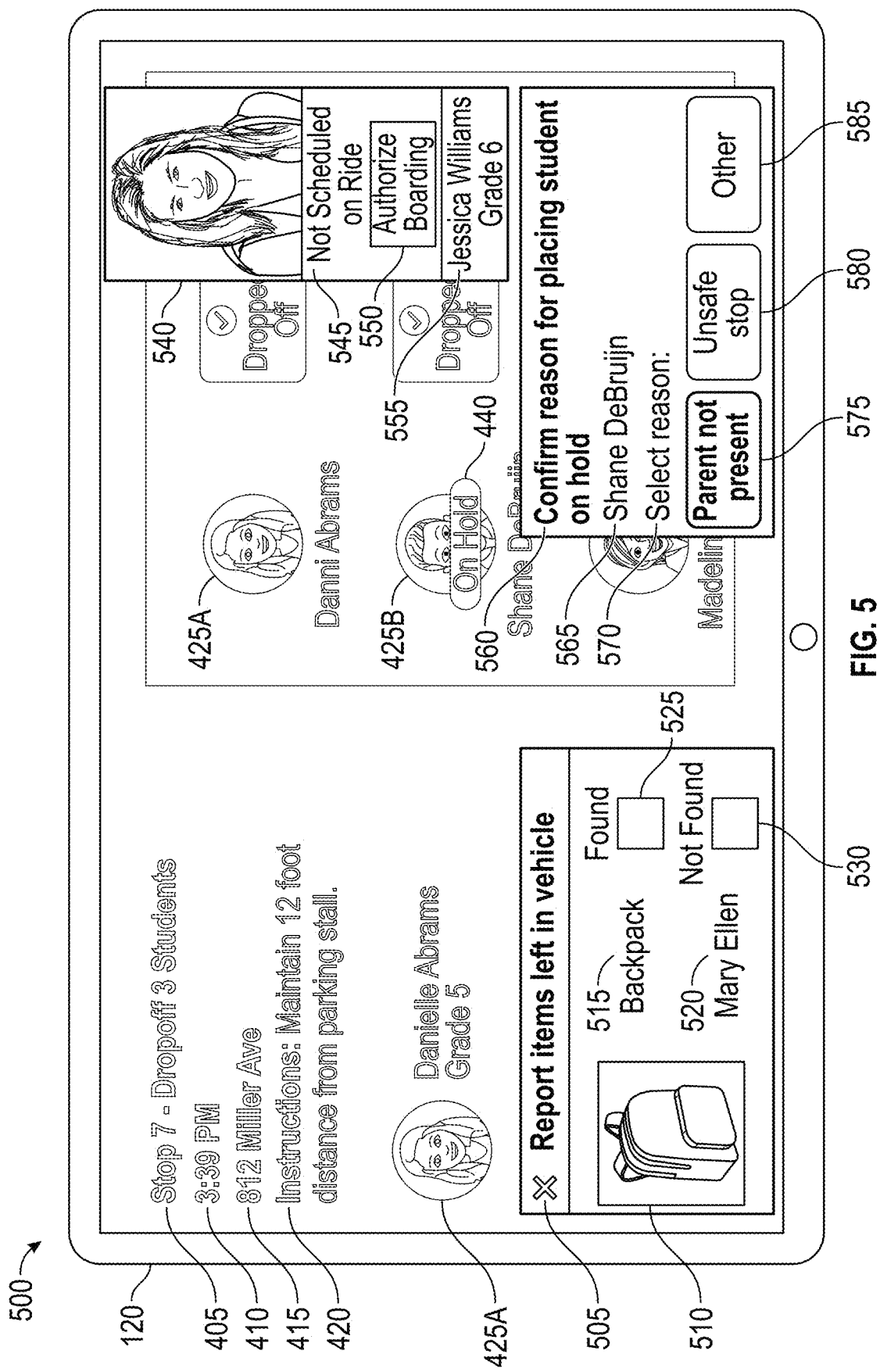
FIG. 5 illustrates an exemplary user interface providing individual interfaces for driver information.

FIG. 4 illustrates an exemplary user interface 400 for a drop off of students. As the above disclosure with respect to FIG. 2 and FIG. 3 discussed picking up students at a beginning of a ride, FIGS. 4 and 5 discuss how those same students are dropped off at the end of the ride. To be clear, in this example, a bus service may pick up a child twice a day and drop off a child twice a day in two trips. In other words, a child may be picked up near their home in the morning for a first trip and dropped off at school for the day for a second trip. After school, the child may be picked up at school and dropped off near their home. This disclosure applies to both individual trips in terms of picking up a student near their home, for example, and dropping off that student at school. FIG. 4 and FIG. 5 discuss dropping off students different from those picked up previously to differentiate drop off techniques for clarity of explanation. But, if Billy Adams, Mary Ellen, and Jessica Williams, discussed in FIGS. 2 and 3, are picked up in the morning, the drop off procedures discussed with respect to FIG. 4 and FIG. 5 below may apply. FIG. 4 and FIG. 5 merely reference different children on a different route from the school to a stop near their homes, for example.

As shown in FIG. 4, a user interface 400 is provided via driver device 120. User interface 400 may include information 405 about the parameters of a drop off. For example, user interface 400 identifies this particular stop as "stop 7" where 3 students are to be dropped off. User interface 400 includes arrival time information 410, which indicates that the bus is to arrive at 3:39 and location information 415 for the stop at 812 Miller Avenue. User interface may further provide other information, like information 215, which includes information about the stop, or particular riders. For example, if a student has a wheelchair, information may be provided as instruction information 420 that a child needs help with boarding/exiting the bus with the wheelchair or information about where the stop should take place, as shown, with instructions to maintain a 12 foot distance from a parking stall at 812 Miller Avenue.

User interface 400 may further provide information about the drop off students. For example, drop off student 425A is illustrated with a picture as Danielle Abrams, a $5^{th}$ grader, drop off student 425B is illustrated with a picture as Shane DeBruijin, a $2^{nd}$ grader, and drop off student 425C is illustrated with a picture as Madeline Choi, a $3^{rd}$ grader.

Driver device 120 may communicate with server device 135 via communication network 105 to provide location information. Thus, when server device 135 or driver device 120 detects that the bus has arrived at 812 Miller Avenue, server device 135 may provide drop off interface 445.

Drop off interface 445 may include the same pictures illustrated as drop off information, identifying drop off students 425A-425C, as Danni Abrams (a preferred name for Danielle), Shane DeBruijin, and Madeline Choi. Drop off information for drop off student 425A, Danni Abrams, may include a dropped off interface button 430A and an on-hold interface button 435A for interaction by the driver device. In the case of Danni Abrams, the bus driver may determine that Danni's mom is at the bus stop to receive custody of Danni Abrams as she exits the bus. In response, server 135 may detect that the bus driver interacted with drop off button 430 to indicate that Danni has left the bus into the care of an adult. Madeline Choi, drop off student 425C may also be released into the care of her father as identified by the driver interacting with drop off button 430C which is reported to server 135.

In this particular case, no one is at Stop 7 for Shane Debruijin. Instead of releasing Shane, a 2nd grader, from the bus, the driver may interact with on-hold interface button 435 and notify server 135 that the driver does not intend to drop Shane Debruijin off at 812 Miller Avenue, as will be discussed below. However, Shane Debruijin may be identified by fleet routing system 100 and server device 135 as "on hold" and an icon 440 may be disposed over his picture in drop off interface 445 to identify that Shane Debruijin has not been dropped off even though the bus reached his particular destination. Shane Debruijin may remain on the bus until the bus can return to 812 Miller Avenue to drop him off after the bus services the other stops on the route. Server 135 may notify user device 115, associated with Shane's mother and father, that since they were not at the stop, Shane will be dropped off at a newly estimated time, provided to user device 115 by server 135, when his parents can meet him at 812 Miller Avenue.

FIG. 5 illustrates an exemplary user interface 500 providing individual interfaces for driver information. During the drop off shown in FIG. 4 as user interface 400, a user interface 500 may be provided which includes any one of a lost item interface 505, an unassigned rider interface 540, or an on hold confirmation interface 560, which will be discussed in turn.

Lost item interface 505 may operate as a two way notification interface. For example, driver device 120 may be used by the driver to document a lost item that was left on the bus. In this example, a picture of the item 510 may be provided. Item 510 as shown in FIG. 5 is a backpack and may be identified by a description 515 and an owner 520, if known. The driver may mark the item as found through found check box 525. Alternatively, a request may be submitted by user 115, Mary Ellen's parent, which provides a picture in lost item interface 505 for a driver to identify. Lost item interface 505 may provide a description 515 of the lost item and a name of the student for whom the lost item notification is being provided by lost interface 505. The driver may be provided with found check box 525 and not found check box 530 which cause server 135 to transmit a notification to user device 115 that indicates whether the device was found or not found by the driver of the bus.

User interface 500 may further include an unassigned rider interface 540, which may be similar to unassigned rider interface 310, which may be provided if, for example, Jessica Williams wants to exit the bus once she got on the bus as an unassigned rider. This may be referred to as a "hop off" request. For example, unassigned rider interface 540 may include a picture of Jessica Williams, an indicator 545 that Jessica is not scheduled on the ride, and a button 550 that authorizes Jessica to exit the bus. Further information about Jessica may be provided in an information interface 555, including her name, her grade level, and any other special instructions for helping her board or exit a bus.

User interface 500 may further include an on hold confirmation interface 560. On hold confirmation interface 560 provides documentation for why a child was not dropped off at a particular stop. For example, as discussed with respect to FIG. 4, Shane Debruijin, drop off rider 425B was put on hold. On hold confirmation interface 560 may be provided in response to a driver pushing button 435B in drop off interface 445 of user interface 400. On hold confirmation interface 560 identifies the name of the child being put on hold via name information 560 and causes the driver to select a reason 570 why the child is being put on hold. On hold confirmation interface 560 allows a user to select from one of a plurality of buttons, such as a parent not present button 575, an unsafe stop button 580 and an other button 585. In this manner, driver device 120 can inform server device 135 the nature of the reason for, in this case, marking Shane Debruijin as on hold and server device 135 may determine, using an associated artificial intelligence engine, how to remedy the problem. For example, if server 135 is provided information from driver device 120 that indicates that a parent was not present, server 135 may add an additional stop after the last stop to return to Stop 7 and may notify Shane's parents via user device 115 when he will arrive, as discussed above. If server 135 is provided information from driver device 120 that indicates that a stop is not a safe via unsafe stop button 580, server 135 may, via associated artificial intelligence engine, identify a safe stop elsewhere that would be acceptably safe for performing a drop off for Shane. Server 135 may notify user device 115 to allow Shane's parents to meet Shane at a new drop off point.

Similarly, if server 135 is provided information from driver device that indicates an "other" reason by other button 585, the driver may be provided with a text box or a button to call the provider user to explain the reason Shane was put on hold and give the provider, via provider device 130, an opportunity to resolve the "other" reason and communicate potential resolutions to user device 115 for correlation with Shane's parents.

Figure 6:
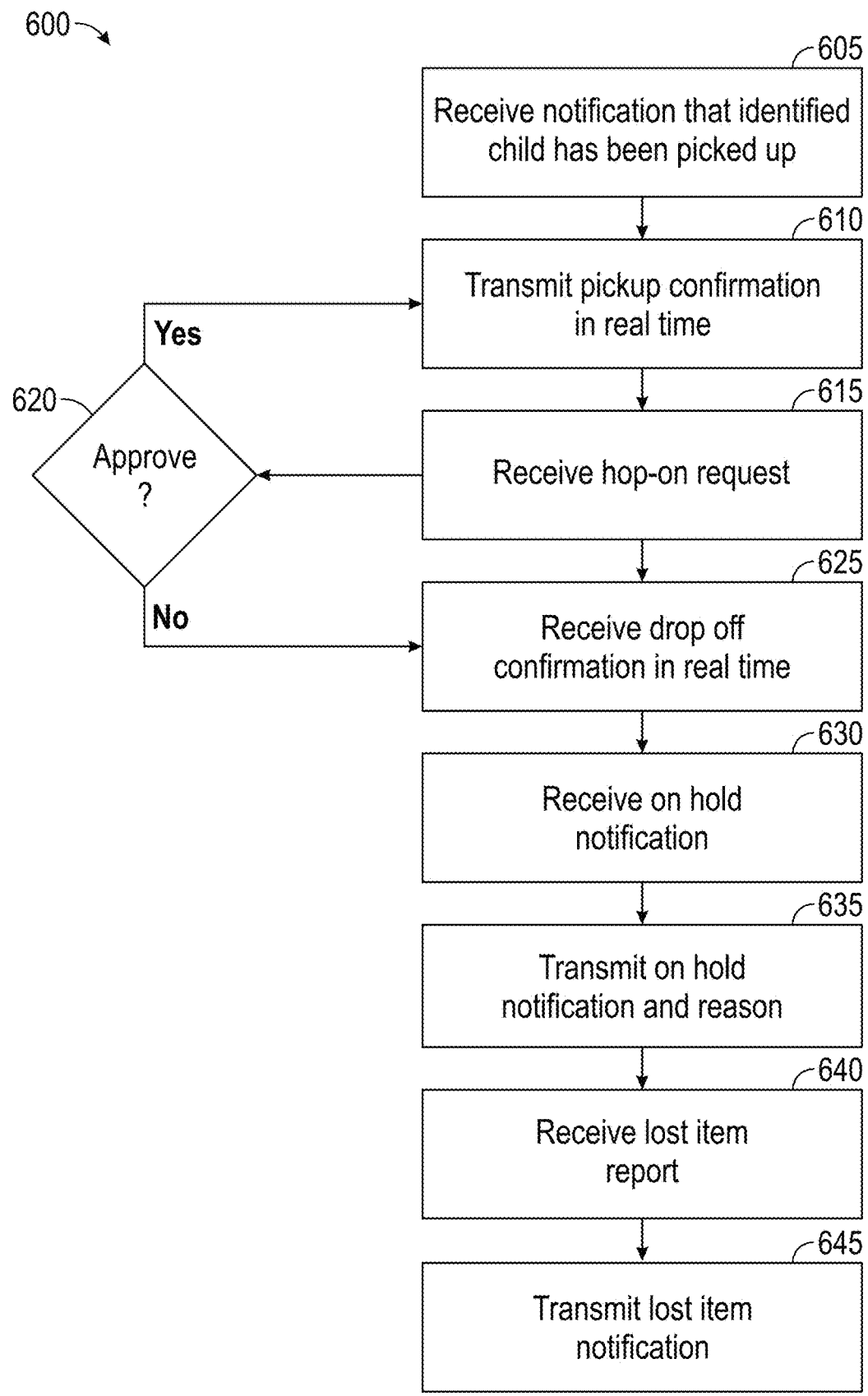
FIG. 6 illustrates a user interface providing a method for identifying pick up passengers and drop off passengers.

FIG. 6 illustrates a user interface providing a method 600 for identifying pick up passengers and drop off passengers. Method 600 begins at step 605 as a server device may receive a notification that an identified child has been picked up. A pickup confirmation message may be transmitted to user device 115 in real time by server 135 to inform a user of user device 115 that the child has been picked up at step 610 and identified through the fleet routing system (e.g., by using an identifier to uniquely identify the child to fleet routing system 135 by driver device 120. In step 615, a server device may optionally receive a hop on request where a child, for example, is requesting to board a bus that the student is not assigned to by fleet routing system 100. In this embodiment, server device 135 may receive an indication of whether or not the request was approved by the driver through driver device 120 at step 620. At step 620—Yes, a rider is approved for boarding and a pickup confirmation is transmitted to user device 115 associated with legal guardian of the student. If the hop on request is rejected, (step 620—No), server device 135 may receive a drop off confirmation in real time at step 625. In other words, server device 135 may send a message to a user device 115 indicating that the child was not admitted onto the bus and that the user of user device 115 should take remedial action.

Server device 135 may further receive a drop off confirmation in real time at step 625 for one or more students who are riding the bus, as appropriate, to user device 115. For example, if a student is being dropped off at school, server device 135 may transmit a message to user device 115 at step 625 that a child has been dropped off at school. If a student is being dropped off at home, step 625 may be optional pending a drop-off situation. For example, at step 630 a driver may identify that a parent is not at a particular drop off location and assign an "on hold" condition to a particular rider. Server device 135 may transmit an on hold notification to a user of user device 115 at step 635, which notifies the user of where their child is and where and when they can expect to meet the child. Server device may receive a lost item report 640 either through driver device 120 or user device 115 and correlate with the other corresponding device to facilitate transmission of lost item notifications at step 645 to assist in locating the item. Steps 640 and 645 may be optional steps, as desired.

In this manner, a user of user device 115, typically a parent, may ensure correct custody of a child throughout a day. For example, a user could drop a child off at a pick up location for a bus and know that the child properly boarded the bus and was conveyed to the identified school building where custody of the child is transferred to the school for the day. At the same time, when the child is released from school back into the custody of the bus driver, the user may be informed via server device 135 sending a message to user device 115, and notifying the user of user device 115 by message for when to expect the bus to drop off the child back into the custody of the parent. This gives the parent peace of mind in knowing where their child is and who has custody of the child at any particular moment throughout the day.

The techniques described herein may provide significant benefit for both private and governmental entities. On the one hand, vehicle owners may increase utilization of their vehicles, manage their vehicle inventory, and utilization. At the same time, the public, public schools, private schools, and other groups benefit from provided ride charter services for athletic trips, field trips, extracurricular activities, and private events.

The foregoing description has been presented for the purposes of illustration and description. It is not intended to be exhaustive or to limit the disclosure to the precise form disclosed. Many modifications and variations are possible in light of the above disclosure and teachings. Further, it should be noted that any or all of the aforementioned alternate implementations may be used in any combination desired to form additional hybrid implementations of the disclosure. For example, components described herein may be removed and other components added without departing from the scope or spirit of the embodiments disclosed herein or the appended claims.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system, comprising:
   a server computer providing a list of children to be picked up by a vehicle at a particular stop along a route to a driver device, the provided list being provided by the server computer to the driver device as part of a graphical user interface, the graphical user interface including a plurality of pick up options for each child in the list of children, including a picked up interface button, a no show interface button, and a canceled button including an indicator which indicates a user canceled a pick up for a given child in the list of children prior to the pick up,
   wherein the server computer optimizes the route by an artificial intelligence engine to re-direct the vehicle along a more efficient route based on the indicator,
   wherein the graphical user interface provides a picture, and an identification of each child in the graphical user interface to the driver device with the pick up options,
   wherein in response to receiving an indication that a child in the list of children has been picked up from the driver device, the server computer transmits a message to a user device with confirmation that the child has been picked up;
   wherein once the children in the list of children have been picked up, the server computer provides a list of children to be dropped off by the vehicle at a particular location, the provided list being provided by the server computer to the driver device as part of a graphical user interface, the graphical user interface including a plurality of drop off options for each child in the list of children, including a dropped off button and an on hold button,
   wherein the graphical user interface provides a picture, an identification of each child in the list of children, and individual instruction information for dropping off each child in the list of children in the graphical user interface to the driver device with the drop off options, and
   wherein in response to receiving an indication that the child has been dropped off from the driver device or in response to receiving an indication that the child has been placed on hold, the server computer transmits a message to the user device confirming drop off or including a new estimated drop off time and location.

2. The system of claim 1, wherein a child not included in the list of children requests pick up on the vehicle by providing a unique identifier to the server computer via the driver device.

3. The system of claim 2, wherein server computer receives confirmation that the driver device approved the request.

4. The system of claim 3, wherein the server computer transmits a notification to another user device associated with the child not included in the list of children including a message containing drop off time and location information.

5. The system of claim 1, wherein the server computer receives a reason the child that has been placed on hold.

6. The system of claim 5, wherein the reason includes at least one of an indication that a parent was not present at a stop when the vehicle arrived, an indication that the stop was unsafe, or receives another reason, comprising text information describing the reason.

7. The system of claim 6, wherein the server computer transmits a notification to the user device with a message indicating that the child has been placed on hold and containing a drop off time and location information.

8. The system of claim 1, wherein the server computer receives a notification about a lost item from the user device and transmits a subsequent notification to the driver device about the lost item.

9. The system of claim 1, wherein the server computer receives a notification about a lost item from the driver device and transmits a subsequent notification to the user device about the lost item.

10. The system of claim 1, wherein the server computer provides location information about the child to the user device between pick up and drop off.

11. A method, comprising:
providing, by a server computer, a list of children to be picked up by a vehicle at a particular stop along a route to a driver device, the provided list being provided by the server computer to the driver device as part of a graphical user interface, the graphical user interface including a plurality of pick up options for each child in the list of children, including a picked up interface button, a no show interface button, and a canceled button including an indicator which indicates a user canceled a pick up for a given child in the list of children prior to the pick up,
optimizing, by the server computer, the route by an artificial intelligence engine to re-direct the vehicle along a more efficient route based on the indicator;
providing, by the server computer, a picture, and an identification of each child in the graphical user interface to the driver device with pickup options;
transmitting, by the server computer and in response to receiving an indication that a child in the list of children has been picked up from the driver device, a message to a user device with confirmation that the child has been picked up;
providing, by the server computer and once the children in the list of children have been picked up, a list of children to be dropped off by the vehicle at a particular location, the provided list being provided by the server computer to the driver device as part of a graphical user interface, the graphical user interface including a plurality of drop off options for each child in the list of children, including a dropped off button and an on hold button;
providing, by the server computer, a picture, an identification of each child in the list of children, and individual instruction information for dropping off each child in the list of children in the graphical user interface to the driver device with the drop off options; and transmitting, by the server computer, and in response to receiving an indication that the child has been dropped off from the driver device or in response to receiving an indication that the child has been placed on hold, a message to the user device confirming drop off or including a new estimated drop off time and location.

12. The method of claim 11, wherein a child not included in the list of children requests pick up on the vehicle by providing a unique identifier to the server computer via the driver device.

13. The method of claim 12, further comprising:
receiving, by the server computer, confirmation that the driver device approved the request.

14. The method of claim 13, further comprising:
transmitting, by the server computer, a notification to another user device associated with the child not included in the list of children including a message containing drop off time and location information.

15. The method of claim 11, further comprising:
receiving, by the server computer, a reason the child that has been placed on hold.

16. The method of claim 15, wherein the reason includes at least one of an indication that a parent was not present at a stop when the vehicle arrived, an indication that the stop was unsafe, or receives another reason, comprising text information describing the reason.

17. The method of claim 16, further comprising:
transmitting, by the server computer, a notification to the user device with a message indicating that the child has been placed on hold and containing a drop off time and location information.

18. The method of claim 11, further comprising:
receiving, by the server computer, a notification about a lost item from the user device and transmits a subsequent notification to the driver device about the lost item.

19. The method of claim 11, further comprising:
receiving, by the server computer, a notification about a lost item from the driver device and transmits a subsequent notification to the user device about the lost item.

20. The method of claim 11, further comprising:
providing, by the server computer, location information about the child to the user device between pick up and drop off.

* * * * *